United States Patent
Shimizu et al.

(10) Patent No.: US 10,098,014 B1
(45) Date of Patent: Oct. 9, 2018

(54) BEAM ALIGNMENT USING SHARED DRIVING INTENTION FOR VEHICULAR MMWAVE COMMUNICATION

(71) Applicant: TOYOTA JIDOSHA KABUSHIKI KAISHA, Toyota-shi, Aichi-ken (JP)

(72) Inventors: Takayuki Shimizu, Mountain View, CA (US); Gaurav Bansal, Mountain View, CA (US)

( * ) Notice: Subject to any disclaimer, the term of this patent is extended or adjusted under 35 U.S.C. 154(b) by 0 days.

(21) Appl. No.: 15/885,778

(22) Filed: Jan. 31, 2018

(51) Int. Cl.
*H04W 16/28* (2009.01)
*H04W 4/02* (2018.01)
*H04W 4/40* (2018.01)
*H04W 4/80* (2018.01)

(52) U.S. Cl.
CPC ........... *H04W 16/28* (2013.01); *H04W 4/027* (2013.01); *H04W 4/40* (2018.02); *H04W 4/80* (2018.02)

(58) Field of Classification Search
CPC ..... H04W 4/02; H04W 64/006; H04W 4/025; H04W 24/02; H04W 24/04; H04W 28/18; H04W 4/027; H04W 4/046; H04W 16/28; H04W 4/80; H04W 4/40
See application file for complete search history.

(56) References Cited

U.S. PATENT DOCUMENTS

| | | | |
|---|---|---|---|
| 2014/0032021 A1* | 1/2014 | Metzler | G01S 5/0036 701/3 |
| 2014/0286156 A1* | 9/2014 | Kohli | H04B 15/00 370/225 |
| 2017/0353870 A1* | 12/2017 | Rybakowski | H04W 16/28 |

FOREIGN PATENT DOCUMENTS

JP    PO2004-072268    3/2004

\* cited by examiner

*Primary Examiner* — Daniel Lai
(74) *Attorney, Agent, or Firm* — Burbage Law, P.C.; Jon-Michael Burbage; Elizabeth Ruzich

(57) ABSTRACT

The disclosure includes embodiments for performing beam alignment based on driving intentions. A method includes receiving a wireless message that includes first vehicle data that describes a first vehicle position, a first vehicle speed, a first vehicle heading, and a first vehicle driving intention. The method further includes determining whether a blockage is predicted to occur based on a second vehicle position, a second vehicle driving intention, and the first vehicle data. The method further includes, responsive to the blockage being predicted to occur, determining a non-line of sight (NLOS) path based on the second vehicle position, the second vehicle driving intention, and the first vehicle data. The method further includes before the blockage is predicted to occur, performing beam alignment between the first vehicle and the second vehicle based on the NLOS path.

20 Claims, 7 Drawing Sheets

BEAM ALIGNMENT USING SHARED DRIVING INTENTION FOR VEHICULAR MMWAVE COMMUNICATION

BACKGROUND

The specification relates to performing beam alignment based on shared driving intention for vehicular millimeter wave (mmWave) communication.

Vehicles increasingly consume greater amounts of data. For example, vehicles may request high-definition three-dimensional maps, sensor data from other vehicles for autonomous vehicle purposes, streaming data for infotainment purposes, etc. The data may not be reasonably transmitted via conventional means, such as 3G connections, because the data may be too large to transmit or the transmission would be so demanding it would result in poor performance of the vehicle's equipment.

Deploying mmWave communication in vehicles is desirable because mmWave communication is capable of providing gigabit (Gbts) per second data rates over short ranges. However, mmWave communication requires beam alignment between vehicles and current methods for beam alignment are designed for low mobility environments, such as when a stationary base station transmits the beam to another stationary device. This method cannot be applied to high mobility environments that occur when vehicles are moving.

In addition, mmWave communication between vehicles is frequently used in dynamic situations, such as when vehicles are travelling on a roadway. Because mmWave communication relies on transmission between antennas, transmission of mmWave communication between vehicles may be impeded by the presence of a blocker, such as a truck or a bus, because the blocker's height may be taller than the vehicles. Blockage causes a high propagation loss and makes it difficult to maintain a mmWave connection.

SUMMARY

Described herein is a method for performing beam alignment based on driving intentions. A method includes receiving a wireless message that includes first vehicle data that describes a first vehicle position, a first vehicle speed, a first vehicle heading, and a first vehicle driving intention. The method further includes determining whether a blockage is predicted to occur based on a second vehicle position, a second vehicle driving intention, and the first vehicle data. The method further includes, responsive to the blockage being predicted to occur, determining a non-line of sight (NLOS) path based on the second vehicle position, the second vehicle driving intention, and the first vehicle data. The method further includes before the blockage is predicted to occur, performing beam alignment between the first vehicle and the second vehicle based on the NLOS path.

In some embodiments, the method further includes responsive to the blockage not being predicted to occur, performing beam alignment based on the second vehicle position, the second vehicle driving intention, and the first vehicle data. In some embodiments, the first vehicle driving intention describes coarse driving intention and a planned trajectory. In some embodiments, the method further includes transmitting a mmWave communication based on the beam alignment. In some embodiments, the wireless message is a dedicated short range communication message (DSRC) or a long-term evolution vehicle to everything (LTE-V2X) message. In some embodiments, the NLOS path includes reflecting a beam off of a reflector to reach the first vehicle. In some embodiments, the method further includes determining second vehicle data that describes the second vehicle position, a second vehicle speed, a second vehicle heading, and the second vehicle driving intention, where determining the NLOS path is further based on the second vehicle speed and the second vehicle heading. In some embodiments, wherein the wireless message is transmitted by the first vehicle or a road-side unit (RSU). In some embodiments, the blockage is a third vehicle, the second vehicle receives a DSRC message or a LTE-V2X message that includes third vehicle data, and determining whether the blockage is predicted to occur is further based on the third vehicle data.

A system can comprise an onboard vehicle computer of a vehicle that includes a non-transitory memory storing computer code, which, when executed by the onboard vehicle computer system causes the onboard vehicle computer system to: receive a wireless message that includes first vehicle data that describes a first vehicle position, a first vehicle speed, a first vehicle heading, and a first vehicle driving intention, determine whether a blockage is predicted to occur based on a second vehicle position, a second vehicle driving intention, and the first vehicle data, responsive to the blockage being predicted to occur, determine a non-line of sight (NLOS) path based on the second vehicle position, the second vehicle driving intention, and the first vehicle data, and before the blockage is predicted to occur, perform beam alignment between the first vehicle and the second vehicle based on the NLOS path.

In some embodiments, the onboard vehicle computer system includes additional computer code that causes the onboard vehicle computer system to responsive to the blockage not being predicted to occur, performing beam alignment based on the second vehicle position, the second vehicle driving intention, and the first vehicle data. In some embodiments, the first vehicle driving intention describes coarse driving intention and a planned trajectory. In some embodiments, the onboard vehicle computer system includes additional computer code that causes the onboard vehicle computer system to transmit a mmWave communication based on the beam alignment. In some embodiments, the wireless message is a dedicated short range communication message (DSRC) or a long-term evolution vehicle to everything (LTE-V2X) message.

One general aspect includes a non-transitory memory encoded with a computer program, the computer program comprising instructions that, when executed by one or more processors, cause the one or more processors to perform operations comprising receiving a wireless message from a vehicle that includes vehicle data that describes a vehicle position, a vehicle speed, a vehicle heading, and a vehicle driving intention, determining whether a blockage is predicted to occur based on a roadside unit (RSU) position and the vehicle data, responsive to the blockage being predicted to occur, determining a non-line of sight (NLOS) path based on the RSU position and the vehicle data, and before the blockage is predicted to occur, performing beam alignment between the RSU and the vehicle based on the NLOS path.

In some embodiments, the operations further comprise responsive to the blockage not being predicted to occur, performing beam alignment based on the RSU position and the vehicle data. In some embodiments, the vehicle driving intention describes coarse driving intention and a planned trajectory. In some embodiments, the operations further comprise transmitting a mmWave communication to the vehicle based on the beam alignment, wherein the mmWave communication includes high-definition three-dimensional map data or sensor data. In some embodiments, the wireless message is a dedicated short range communication message (DSRC) or a long-term evolution vehicle to everything (LTE-V2X) message. In some embodiments, the NLOS path includes reflecting a beam off of a reflector to reach the vehicle.

The specification describes performing beam alignment based on shared driving intention for vehicular mmWave communication that advantageously describes a way to accurately communicate between vehicles without suffering degradation of the mmWave communication from blockages. As a result, the mmWave communication results in safer, efficient, and proactive driving because it is possible to share sensor data among different vehicles. In addition, the vehicles can receive an updated global high-definition three-dimensional (HD 3D) map. Furthermore, a HD 3D map for the entire country does not have to be stored on a vehicle because the vehicle can continue to receive portions of the HD 3D map via mmWave communication. Lastly, the mmWave communication may provide for additional vehicular content, such as streaming services for infotainment purposes.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example Overview

A first vehicle may transmit a wireless message to a second vehicle either directly or via a roadside unit (RSU). The wireless message may include a dedicated short range communication (DSRC) message or a long-term evolution vehicle to everything (LTE-V2X) message. The message may include first vehicle data that describes a first vehicle position, a first vehicle speed, a first vehicle heading, and a first vehicle driving intention. The first vehicle driving intention may describe coarse driving intention to change lanes, move, stop, part, merge onto a highway, travel in a rotary, cross at a four-way stop, etc. by describing the location of the first vehicle as a function of time and/or planned trajectories that have a more long-term description of the location of the first vehicle as a function of time.

The second vehicle may include a beam alignment application that determines whether a blockage is predicted to occur based on the first vehicle data and second vehicle data that describes a second vehicle position, a second vehicle speed, a second vehicle heading, and a second vehicle driving intention. If the beam alignment application determines that the blockage is predicted to occur, the beam alignment application determines a non-line of sight (NLOS) path based on the first vehicle data and the second vehicle data. The beam alignment application then performs beam alignment between the first vehicle and the second vehicle based on the NLOS path.

If the beam alignment application does not predict that a blockage will occur, the beam alignment application performs beam alignment based on the first vehicle data and the second vehicle data. Once the beams are aligned between the first vehicle and the second vehicle and a communication link is established, the second vehicle transmits mmWave communications to the first vehicle.

Example System

Figure 1:
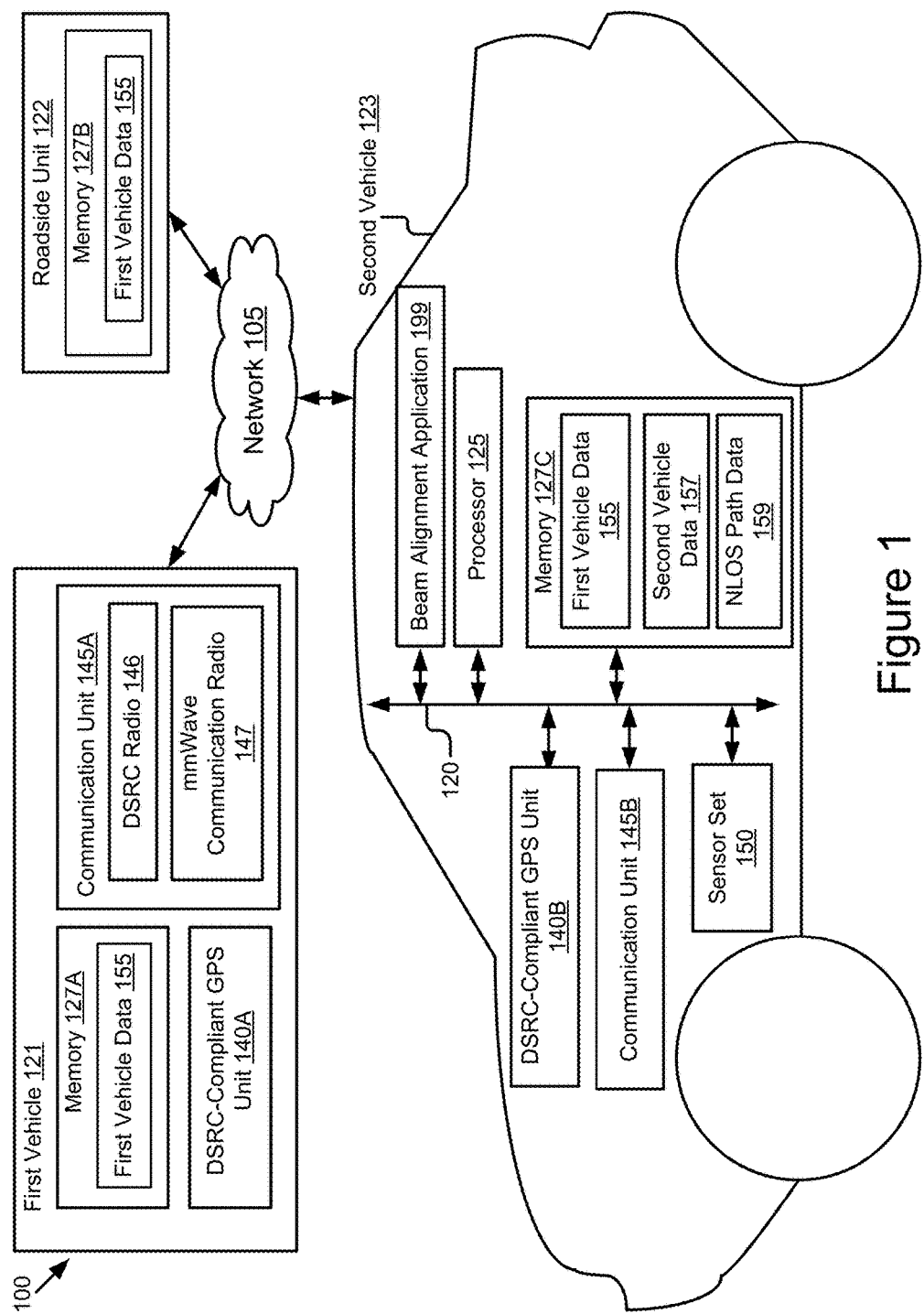
FIG. 1 is a block diagram illustrating an operating environment for a beam alignment application according to some embodiments.

Referring to FIG. 1, is an operating environment 100 for a beam alignment application 199 according to some embodiments. As depicted, the operating environment 100 includes the following elements: a first vehicle 121, a RSU 122, and a second vehicle 123. These elements are communicatively coupled to one another by a network 105.

Although one first vehicle 121, one RSU 122, one second vehicle 123, and one network 105 are depicted in FIG. 1, in practice the operating environment 100 may include one or more first vehicles 121, one or more RSUs 122, one or more second vehicles 123, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, long-term evolution (LTE), LTE-vehicle to everything (V2X), LTE-D2D, VoLTE or any other mobile data network or combination of mobile data networks. Further, the network 105 may include one or more IEEE 802.11 wireless networks.

The first vehicle 121 may include a memory 127A, a DSRC-compliant GPS unit 140A, and a communication unit 145A. In FIG. 1 and the remaining figures, a letter after a reference number represents a reference to the element having that particular reference number. For example, 127A refers to the memory on the first vehicle 121 and 127B refers to the memory on the RSU 122. A reference number in the text without a following letter represents a general reference to embodiments of the element bearing that reference number. For example, 127 refers to memory in general.

The memory 127A may store first vehicle data 155. In some embodiments, first vehicle data 155 may include data generated by the DSRC-compliant GPS unit 140A. For example, the first vehicle data 155 may describe a first vehicle position, a first vehicle speed, a first vehicle heading, and a first vehicle driving intention. The first vehicle driving intention may describe a driving intention to change lanes, move, stop, park, merge onto a highway, travel in a rotary, cross at a four-way stop, etc. by describing the location of the second vehicle 123 as a function of time. The DSRC-compliant GPS unit 140A may generate the first vehicle data 155 periodically, such as every 100 msec. The communication unit 145A may transmit the first vehicle data 155 periodically to the network 105.

In some embodiments, the DSRC-compliant GPS unit 140A includes any hardware and software necessary to make the first vehicle 121 or the DSRC-compliant GPS unit 140A compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); and EN 13372:2004 Dedicated Short-Range Communication—DSRC profiles for RTTT applications (review); EN ISO 14906:2004 Electronic Fee Collection—Application interface.

In some embodiments, the first vehicle 121 does not include a conventional global positioning system unit ("GPS unit"), and instead includes a DSRC-compliant GPS unit 140A. A conventional GPS unit provides positional information that describes a position of the conventional GPS unit with an accuracy of plus or minus 10 meters of the actual position of the conventional GPS unit. By comparison, a DSRC-compliant GPS unit 140A provides GPS data that describes a position of the DSRC-compliant GPS unit 140A with an accuracy of plus or minus 1.5 meters of the actual position of the DSRC-compliant GPS unit 140. This degree of accuracy is referred to as "lane-level accuracy" since, for example, a vehicle lane is generally about 3.7 meters wide, and an accuracy of plus or minus 1.5 meters is sufficient to identify which lane a vehicle is travelling in among other vehicle lanes. In some embodiments, a DSRC-compliant GPS unit 140A is operable to identify, monitor and track its two-dimensional position within 1.5 meters of its actual position 68% of the time under an open sky.

In some embodiments, the DSRC-compliant GPS unit 140A is operable to provide the first vehicle data 155 describing the location of the first vehicle 121 with lane-level accuracy. For example, the first vehicle 121 is driving on a four-lane highway. Lane-level accuracy means that the location of the first vehicle 121 is described by the first vehicle data 155 so accurately that the second vehicle's 123 position in the third of the four lanes may be accurately determined based on the first vehicle data 155 for this first vehicle 121 as provided by the DSRC-compliant GPS unit 140A.

In some embodiments, the DSRC-compliant GPS unit 140A includes hardware that wirelessly communicates with a GPS satellite to retrieve first vehicle data 155 that describes the geographic location of the first vehicle 121 with a precision that is compliant with the DSRC standard. The DSRC standard requires that first vehicle data 155 be precise enough to infer if two vehicles (one of which is, for example, first vehicle 121) are located in adjacent lanes. In some embodiments, the DSRC-compliant GPS unit 140A is operable to identify, monitor, and track its two-dimensional position within 1.5 meters of its actual position 68% of the time under an open sky. Since traffic lanes are typically 3.7 meters wide, whenever the two-dimensional error of the first vehicle data 155 is less than 1.5 meters, the first vehicle data 155 may be analyzed to determine what lane the first vehicle 121 is travelling in based on the relative positions of two or more travelling vehicles (one of which is, for example, first vehicle 121) in multiple lanes at the same time.

The communication unit 145A transmits and receives data to and from the network 105 or to another communication channel. For example, the communication unit 145A transmits the first vehicle data 155 to the network 105, which sends it to the RSU 122 and/or the second vehicle 123. In some embodiments, the communication unit 145A may include a DSRC radio 146, a mmWave communication radio 147, and other hardware or software necessary to make the first vehicle 121 a DSRC-equipped device and a mmWave communication equipped vehicle.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, Bluetooth®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); EN 13372: 2004 Dedicated Short-Range Communication—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes a DSRC radio 146. The DSRC radio 146 is a hardware unit that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 146 includes a non-transitory memory, which stores digital data that controls the frequency for broadcasting DSRC messages. In some embodiments, the non-transitory memory stores a buffered version of the first vehicle data 155 for the first vehicle 121 so that the first vehicle data 155 for the first vehicle 121 is broadcast as an element of the DSRC messages, which are regularly broadcast by the DSRC radio 146.

In some embodiments, the DSRC radio 146 includes any hardware or software which is necessary to make the first vehicle 121 compliant with the DSRC standards. In some embodiments, the DSRC-compliant GPS unit 140A is an element of the DSRC radio 146.

In some embodiments, the DSRC radio 146 includes a non-transitory memory which stores digital data that controls the frequency for broadcasting DSRC messages. In some embodiments, the non-transitory memory stores a buffered version of the first vehicle data 155 discussed below for the first vehicle 121 so that the first vehicle data 155 for the first vehicle 121 is broadcast as an element of the DSRC messages which are regularly broadcast by the DSRC radio 146.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); and EN 13372:2004 Dedicated Short-Range Communication—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz.

The DSRC messages are communicated using a vehicular-adapted wireless messaging protocol. One type of DSRC message is known as a Basic Safety Message ("BSM" if singular or "BSMs" if plural). A BSM includes BSM data. The BSM data describes attributes of the vehicle. For example, the BSM may include two parts.

Part 1 of the BSM data contains core data elements and is transmitted at an adjustable rate of about 10 times per second. Part 1 of the BSM data may describe one or more of the following: (1) GPS data describing a position of the vehicle; (2) motion data for the vehicle; and (3) a path history of the vehicle. The position of the vehicle may include latitude, longitude, elevation, positional accuracy, and a time associated with the position. The motion of the vehicle may include a transmission state, a speed of the vehicle, a heading of the vehicle, a steering wheel angle of the vehicle, a four-way acceleration set for the vehicle that includes three axes of acceleration plus yaw rate, and a brake system status. In some embodiments, part 1 may also include vehicle size.

Part 2 of the BSM data may include a variable set of data elements drawn from a list of optional elements. The list of optional elements may include a path history, a path prediction, information about hard active braking, information about a traction control system when it is active over 100 msec, information about an antilock brake system when it is active over 100 msec, a status of lights that are changed, a status of exterior lights, information about a change of the wipers, a status of the wipers, and vehicle type. Some of the BSM data included in Part 2 of the BSM are selected based on event triggers, e.g., anti-locking brake system ("ABS") being activated may trigger BSM data relevant to the ABS system of the vehicle. In some embodiments, the selected data elements are added to part 1 and sent as part of the BSM, but are transmitted less frequently in order to conserve bandwidth. In some embodiments, part 2 also includes current snapshots, with the exception of path data, which is itself limited to a few seconds worth of past history data.

The BSM may be broadcast at a bandwidth between 5.850 and 5.925 gigahertz. The transmission range of the BSM may be as large as 1,000 meters. DSRC-enabled vehicles broadcast a BSM at a regular interval, which is referred to below as a "time frame." In some embodiments, a radar interference management system is programmed with a default time frame value, for example, 0.01 seconds. The time frame may be user adjustable. In some embodiments, the BSM is broadcast at an adjustable rate of once every 0.10 seconds.

In some embodiments, the communication unit 145A of the first vehicle 121 includes one or more mmWave communication radios 147. The mmWave communication radio 147 includes a transceiver for transmitting a mmWave communication and a receiver for receiving a mmWave communication. The mmWave communication transceiver transmits mmWave messages to the network 105, which is received by the second vehicle 123. The mmWave communication receiver receives mmWave messages from the second vehicle 123 via the network 105. In this way, the first vehicle 121 and the second vehicle 123 transmit mmWave messages to one another. In some embodiments, the mmWave communication radio 147 includes transceivers and receivers on the front and rear bumpers and sides for communication with the second vehicle 123 and other vehicles, and a transceiver and a receiver on the rooftop for communication with infrastructure, such as the RSU 122.

The RSU 122 may be a stationary device that communications with vehicles within a particular geographic area.

For example, the RSU 122 may transmit DSRC messages, which typically have a maximum range of about 1,000 meters. The RSU 122 may include a memory 127B that includes first vehicle data 155 received from the first vehicle 121 via the network 105. The RSU 122 may transmit the first vehicle data 155 to the network 105, which transmits the first vehicle data 155 to the second vehicle 123. The RSU 122 may include a communication unit (not illustrated) with a DSRC radio (not illustrated) for transmitting the first vehicle data 155 as a DSRC message. In some embodiments, the RSU 122 may transmit the first vehicle data 155 as a wireless message using LTE-V2X. In some embodiments, the RSU 122 receives vehicle data from multiple vehicles and aggregates the vehicle data. The RSU 122 may transmit the aggregated vehicle data to the second vehicle 123 via the network 105. In some embodiments, the RSU 122 includes a mmWave communication transceiver and receiver (not illustrated) for sending mmWave communications to the first vehicle 121 and/or the second vehicle 123.

The second vehicle 123 is any type of vehicle with an onboard vehicle computer that is enabled for mmWave communication and wireless messaging, such as DSRC messages and/or LTE-V2X messages. For example, the second vehicle 123 is one of the following types of vehicles: a car; a truck; a sports utility vehicle; a bus; a semi-truck; a drone; or any other roadway-based conveyance.

In some embodiments, the second vehicle 123 includes the following elements: a processor 125; a memory 127C; a communication unit 145B; a DSRC-compliant GPS unit 140B; a sensor set 150; and the beam alignment application. Each of the elements communicate via a bus 120.

In some embodiments, the processor 125 and the memory 127C may be elements of the onboard vehicle computer system (such as the computer system 200 described below with reference to FIG. 2). The onboard vehicle computer system may be operable to cause or control the operation of the beam alignment application 199. The onboard vehicle computer system may be operable to access and execute the data stored on the memory 127C to provide the functionality described herein for the beam alignment application 199 or its elements (see, e.g., FIG. 2). The onboard vehicle computer system may be operable to execute the beam alignment application 199, which causes the onboard vehicle computer system to execute one or more of the steps of the method 900 described below with reference to FIG. 9 or the method 1000 described below with reference to FIG. 10.

In some embodiments, the processor 125 and the memory 127C may be elements of an onboard unit. The onboard unit includes an electronic control unit (herein "ECU") or an onboard vehicle computer system that may be operable to cause or control the operation of the beam alignment application 199. The onboard unit may be operable to access and execute the data stored on the memory 127C to provide the functionality described herein for the beam alignment application 199 or its elements. The onboard unit may be operable to execute the beam alignment application 199 which causes the onboard unit to execute one or more of the steps of the method 900 described below with reference to FIG. 9 or the method 1000 described below with reference to FIG. 10. In some embodiments, the computer system 200 depicted in FIG. 2 is an example of an onboard unit.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The second vehicle 123 may include one or more processors 125. Other processors, operating systems, sensors, displays, and physical configurations may be possible.

The memory 127C is a non-transitory memory that stores instructions or data that may accessed and executed by the processor 125. The instructions or data may include code for performing the techniques described herein. The memory 127C may be a dynamic random access memory (DRAM) device, a static random access memory (SRAM) device, flash memory, or some other memory device. In some embodiments, the memory 127C also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127C may be reserved for use as a buffer or virtual random access memory (virtual RAM). The second vehicle 123 may include one or more memories 127C.

The memory 127C of the second vehicle 123 stores one or more of the following types of digital data: first vehicle data 155; second vehicle data 157; and NLOS path data 159. In some embodiments, the memory 127C stores any data that is necessary for the beam alignment application 199 to provide its functionality. For example, the memory 127C may store historical data about beam alignment.

The first vehicle data 155 is digital data that describes a first vehicle position, a first vehicle speed, a first vehicle heading, and a first vehicle driving intention. The first vehicle driving intention may describe a driving intention to change lanes, move, stop, park, merge onto a highway, travel in a rotary, cross at a four-way stop, etc. by describing the location of the first vehicle 121 as a function of time.

The second vehicle data 157 is digital data that describes a second vehicle position, a second vehicle speed, a second vehicle heading, and a second vehicle driving intention. The second vehicle data 157 may be generated by the DSRC-compliant GPS unit 140B.

The NLOS path data 159 is digital data that describes a path between the first vehicle 121 and the second vehicle 123 that avoids a blockage. The NLOS path data 159 may also include information about the beam transmission, such as a particular wavelength within the mmWave spectrum that the second vehicle 123 uses.

The DSRC-compliant GPS unit 140B is similar to the DSRC-compliant GPS unit 140A described above with reference to the first vehicle 121, and so, will not be described here. The communication unit 145B is similar to the communication unit 145A described above with reference to the first vehicle 121, and so, will not be described here. Although it is not illustrated, the communication unit 145B may include a DSRC radio and a mmWave communication transceiver and receiver.

The sensor set 150 may include one or more devices that provide sensor data about a vehicle operation. For example, the sensor set 150 may include one or more sensors that detect a presence of objects that surround the vehicle 123. The sensor set 150 may be communicatively coupled to an onboard computer of a vehicle so that the sensor data may be stored in the memory 127C and accessible by the beam alignment application 199.

The sensors included in the sensor set 150 may include one or more external sensors such as one or more of the following: a camera or camera array mounted to the exterior of the second vehicle 123, a microphone; a moisture sensor, a thermometer; an altimeter; an accelerometer; a WiFi sniffer; a Bluetooth antenna; a LIDAR camera; a humidistat; an infrared camera, etc.

The sensor set 150 may include an infrared detector, a motion detector, a thermostat, etc. Alternatively or additionally, the sensor set 150 may include a component or module of another system or device included in the second vehicle 123 (e.g., radio, infotainment system, air conditioner, windshield wipers, systems for repositioning vehicle occupant seats, systems for changing the level of vehicle windows, vehicle headlights, vehicle cabin lights, etc.) that reports a status of the system or device to the onboard computer of the second vehicle 123 where it may be monitored or controlled by other elements of the second vehicle 123.

Accordingly, the sensor set 150 may provide sensor data describing one or more of the following: a temperature inside the vehicle; a temperature outside the vehicle; a position of the seats; a radio station; an audio program; a window level; a level of illumination of vehicle headlights or cabin lights, a speed of windshield wipers, and other parameters or settings associated with the vehicle and/or any system, subsystem, or device included in or communicatively coupled to the vehicle.

In some implementations, the sensor set 150 may include sensors for measuring one or more of a current time, a location (e.g., a latitude, longitude, and altitude of a location), an acceleration of the vehicle 123, a velocity of the vehicle 123, a fuel tank level of the vehicle 123, a battery level of the vehicle 123, etc.

In some embodiments, the beam alignment application 199 includes code and routines that are operable, when executed by the processor 125, to cause the processor 125 to execute one or more of the steps of the method 900 described below with reference to FIG. 9 and/or the method 1000 described below with reference to FIG. 10. For example, the beam alignment application 199 may use the first vehicle data 155 and the second vehicle data 157 to determine whether a blockage is predicted to occur in a path made by a beam such that the second vehicle 123 cannot use mmWave communication to communicate with the first vehicle 121. If the blockage is predicted to occur, the beam alignment application 199 determines a NLOS path that avoids the blockage and uses the NLOS path to perform mmWave communication.

In some embodiments, the beam alignment application 199 of the second vehicle 123 may be implemented using hardware including a field-programmable gate array ("FPGA") or an application-specific integrated circuit ("ASIC"). In some other embodiments, the beam alignment application 199 may be implemented using a combination of hardware and software.

Embodiments of the beam alignment application 199 are described in more detail below with reference to FIGS. 2-9.

Example Computer System

Figure 2:
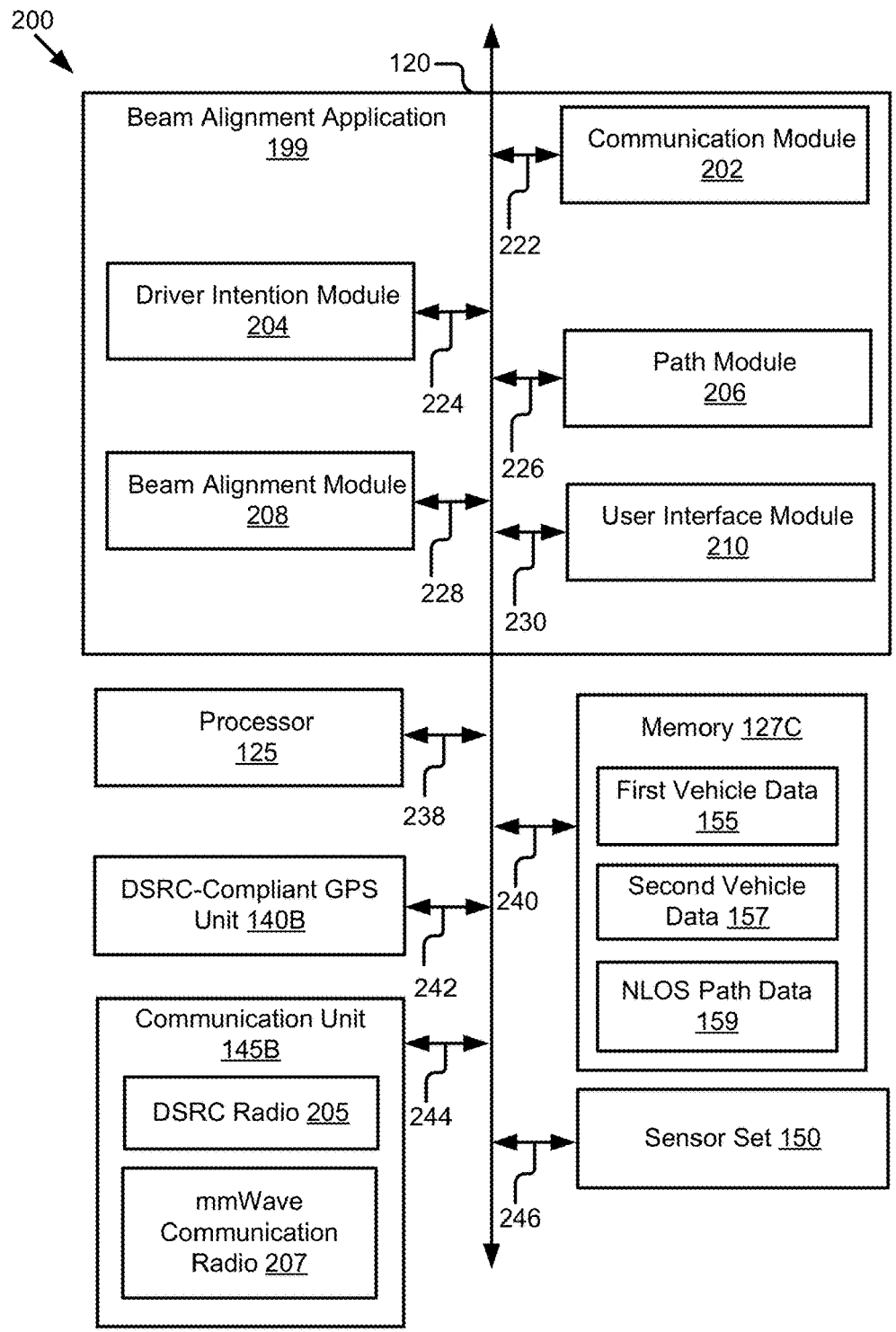
FIG. 2 is a block diagram illustrating an example computer system that includes a beam alignment application according to some embodiments.

Referring now to FIG. 2, depicted is a block diagram illustrating an example computer system 200 including the beam alignment application 199 of the second vehicle 123 of FIG. 1 according to some embodiments.

In some embodiments, the computer system 200 may include a special-purpose computer system that is programmed to perform one or more steps of a method 900 described below with reference to FIG. 9 and/or a method 1000 described below with reference to FIG. 10.

In some embodiments, the computer system 200 is an onboard vehicle computer of the second vehicle 123. In some embodiments, the computer system 200 is an onboard unit of the second vehicle 123 of FIG. 1. In some embodiments, the computer system 200 is an ECU, head unit, or some other processor-based computing device of the second vehicle 123 of FIG. 1.

The computer system 200 may include one or more of the following elements according to some examples: the beam alignment application 199; the processor 125; the memory 127C; the DSRC-compliant GPS unit 140B; the communication unit 145B; and the sensor set 150. Other elements are not illustrated, but may be included, such as an onboard radar system, an autonomous driver assisted system, etc. The components of the computer system 200 are communicatively coupled by a bus 120.

In the illustrated embodiment, the processor 125 is communicatively coupled to the bus 120 via signal line 238. The memory 127C is communicatively coupled to the bus 120 via signal line 240. The DSRC-compliant GPS unit 140B is communicatively coupled to the bus 120 via signal line 242. The communication unit 145B is communicatively coupled to the bus 120 via signal line 244. The sensor set 150 is communicatively coupled to the bus 120 via signal line 246.

The following elements of the computer system 200 were described above with reference to FIG. 1, and so, those descriptions will not be repeated here: the processor 125; the memory 127C; the DSRC-compliant GPS unit 140B; the communication unit 145B; and the sensor set 150. The communication unit 145B is illustrated as including a DSRC radio 205 and a mmWave communication radio 207. Because the DSRC radio 205 is similar to the DSRC radio 146 described with reference to FIG. 1 and the mmWave communication radio 210 is similar to the The memory 127C may store any of the data described above with reference to FIG. 1. The memory 127C may also store any data needed for the computer system 200 to provide its functionality.

As illustrated, the memory 127C stores: the first vehicle data 155; the second vehicle data 157; and the NLOS path data 159. These elements were described above with reference to FIG. 1, and so, their descriptions will not be repeated here. The memory 127C may also store environment sensing information generated by an onboard radar system, sensor data generated by vehicle sensors, data received as a mmWave communication, such as a HD-3D map, sensor data from other vehicles, infotainment data, etc.

The beam alignment application 199, as described in greater detail below, determines how to perform beam alignment for mmWave communications. In the illustrated embodiment shown in FIG. 2, the beam alignment application 199 includes a communication module 202, a driving intention module 204, a path module 206, a beam alignment module 208, and a user interface module 210.

The communication module 202 can be software including routines for handling communications between the beam alignment application 199 and other components of the computer system 200 or one or more of the operating environment 100 of FIG. 1. In some embodiments, the communication module 202 can be a set of instructions executable by the processor 125 to provide the functionality described below for handling communications between the beam alignment application 199 and other components of the computer system 200. In some embodiments, the communication module 202 can be stored in the memory 127C of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145B, to and from one or more elements of the operating environment 100. In some embodiments, the communication module 202 receives or transmits, via the communication unit 145B, wireless messages from the first vehicle 121 or the RSU 122. For example, the communication module 202 receives a wireless message that includes first vehicle data 155 that describes a first vehicle position, a first vehicle speed, a first vehicle heading, and a first vehicle driving intention. The communication module 202 may send or receive any of the data described above with reference to FIG. 1, or below with reference to FIGS. 9 and 10, via the communication unit 145B.

In some embodiments, the communication module 202 receives data from components of the beam alignment application 199 and stores the data in the memory 127C (or a buffer or cache of the memory 127C). For example, the communication module 202 receives second vehicle data 157 from the DSRC-compliant GPS unit 140B and stores the second vehicle data 157 in the memory 127C (or a buffer or cache of the memory 127C). The communication module 202 may also instruct the communication unit 145B to transmit the second vehicle data 157 to the first vehicle 121 and/or the RSU 122.

In some embodiments, the communication module 202 may handle communications between components of the beam alignment application 199. For example, the communication module 202 transmits NLOS path data 159 generated by the path module 206 to the beam alignment module 208.

The driving intention module 204 can be software including routines for determining driving intention. In some embodiments, the driving intention module 204 can be a set of instructions executable by the processor which, when executed by the processor 125, cause the processor 125 to execute one or more of the steps of the method 900 described below with reference to FIG. 9 and/or the method 1000 described below with reference to FIG. 10. In some embodiments, the driving intention module 204 can be stored in the memory 127C of the computer system 200 and can be accessible and executable by the processor 125. The driving intention module 204 may be adapted for cooperation and communication with the processor 125 and other components of the computer system 200 via signal line 224.

In some embodiments, the driving intention module 204 may determine the driving intention by determining a location of the vehicle as a function of time. The driving intention may include two types of driving intention: (1) coarse driving intention; and (2) planned trajectories.

The coarse driving intention may include a predicted location change of the second vehicle 123 in the near future, such as the location of the second vehicle 123 for up to the next ten seconds. For example, the driving intention module 204 may predict based on sensor data from another vehicle or from a traffic server that there is an object that is 100 meters from the current path that the second vehicle 123 is driving in and that the driver will move the second vehicle 123 to a different lane to avoid the object. The coarse driving intention may describe a driving intention to change lanes, move, stop, park, merge onto a highway, travel in a rotary, cross at a four-way stop, etc. by describing the location of the second vehicle 123 as a function of time.

The planned trajectories may include a more long-term prediction of the absolute coordinates of the second vehicle 123 as a function of time. For example, the planned trajectories may include the predicted location of the second vehicle 123 for up to the next ten seconds.

Figure 3:
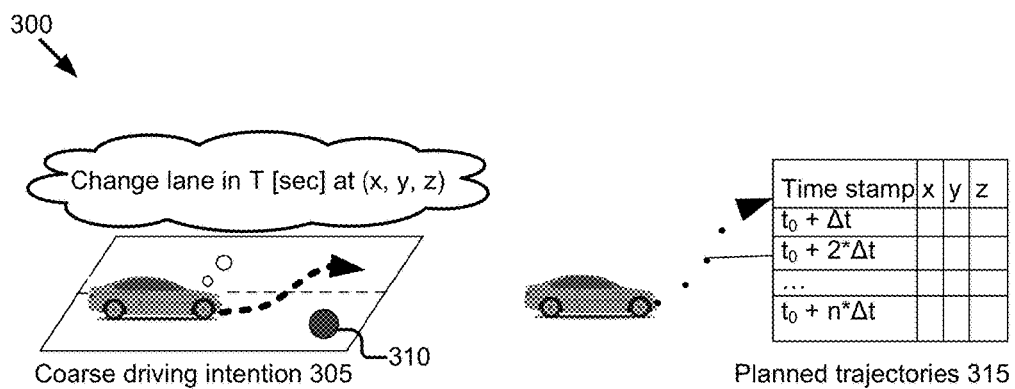
FIG. 3 is a block diagram illustrating coarse driving intention and planned trajectories according to some embodiments.

Turning to FIG. 3, a block diagram 300 illustrates coarse driving intention 305 and planned trajectories 315. The coarse driving intention 305 may describe driving intention to change lanes in T seconds to move to the location (x, y, z). In the illustrated example, the vehicle changes lanes to avoid a pothole 310 in the road. The planned trajectories may describe driving intention for a series of different times with a series of predicted locations. For example, the driving intention module 204 may determine based on traffic data, weather data, map data, and historical journey data, a predicted location of the vehicle.

In some embodiments, the driving intention module 204 receives data from the DSRC-compliant GPS unit 140B and the sensor set 150 to determine driving intention. For example, the driving intention module 204 may receive the location of the second vehicle 123 from the DSRC-compliant GPS unit 140B. In another example, the driving intention module 204 may receive sensor data from the sensor set 150 that describes the conditions outside the second vehicle 123, such as an object in the road that the second vehicle 123 should avoid. The sensor data may also include conditions inside the vehicle, such as whether the second vehicle 123 is accelerating or the position of the steering wheel, which may indicate that the driver is about to change lanes or make a turn. In some embodiments, the driving intention module 204 receives additional data from a source other than the second vehicle 123, such as the first vehicle 121, the RSU 122, or from a server. The first vehicle 121 may provide sensor data generated by the first vehicle 121. The RSU 122 may provide sensor data aggregated from multiple vehicles. The server may provide information about roadside conditions, such as traffic information (e.g., accidents, construction, etc.), weather information, etc.

In some embodiments, the driving intention module 204 receives information from other elements of the second vehicle 123 and uses the information to determine driving intention. For example, the second vehicle 123 may include advanced driver assistance systems (ADAS systems), such as autopilot or cruise control that have consistent ways of moving the second vehicle 123. The driving intention module 204 may use the information from the ADAS systems to predict the future location of the second vehicle 123. In another example, the driving intention module 204 may receive map data from a map application that describes a current journey from a starting point to an end point that the second vehicle 123 is currently travelling on. The map application may be part of the beam alignment application 199 or a separate application. The driving intention module 204 may use the map data to predict the general location of the second vehicle 123 as a function of time. In yet another example, the driving intention module 204 may receive historical journey data that describes locations the second vehicle 123 previously travelled. The driving intention module 204 may use the historical journey data to predict the location of the second vehicle 123 in the future and how a driver may react to certain situations based on the historical journey data. For example, if there is an accident on the route the second vehicle 123 is travelling on, the historical journey data may indicate an alternate route that the driver may take to avoid the accident.

In some embodiments, a driving intention is described by information that is generated and obtained from an ADAS system or automated driving system of the vehicle (e.g., the second vehicle 123).

The driving intention module 204 may store the driving intention as second vehicle data 157 in the memory 127C or transmit the driving intention to the path module 206 via the communication module 202.

The path module 206 can be software including routines for determining how to perform beam alignment. In some embodiments, the path module 206 can be a set of instructions executable by the processor 125 which, when executed by the processor 125, cause the processor 125 to execute one or more of the steps of the method 900 described below with reference to FIG. 9 and/or the method 1000 described below with reference to FIG. 10. In some embodiments, the path module 206 can be stored in the memory 127C of the computer system 200 and can be accessible and executable by the processor 125. The path module 206 may be adapted for cooperation and communication with the processor 125 and other components of the computer system 200 via signal line 226.

The path module 206 may receive the wireless message that includes the first vehicle data 155 from the communication module 202 or by retrieving the first vehicle data 155 from the memory 127C. In some embodiments, the path module 206 receives second vehicle data 157 from the communication module 202, for example, after the second vehicle data 157 is generated by the DSRC-compliant GPS unit 140B and the driving intention module 204. Alternatively, the path module 206 may receive the second vehicle data 157 from the communication module 202 after the communication module 202 retrieves the second vehicle data 157 from the memory 127C.

The path module 206 determines how to perform beam alignment based on determining a path for a beam from the second vehicle 123 to the first vehicle 121. The path module 206 may determine whether a blockage is predicted to occur based on the first vehicle data 155 and the second vehicle data 157. For example, the path module 206 may determine whether the blockage is predicted to occur based on a second vehicle 123 position, a second vehicle 123 driving intention, and the first vehicle 155. The path module 206 determines the path for mmWave communication, which is important for the transfer of large amounts of data.

Figure 4:
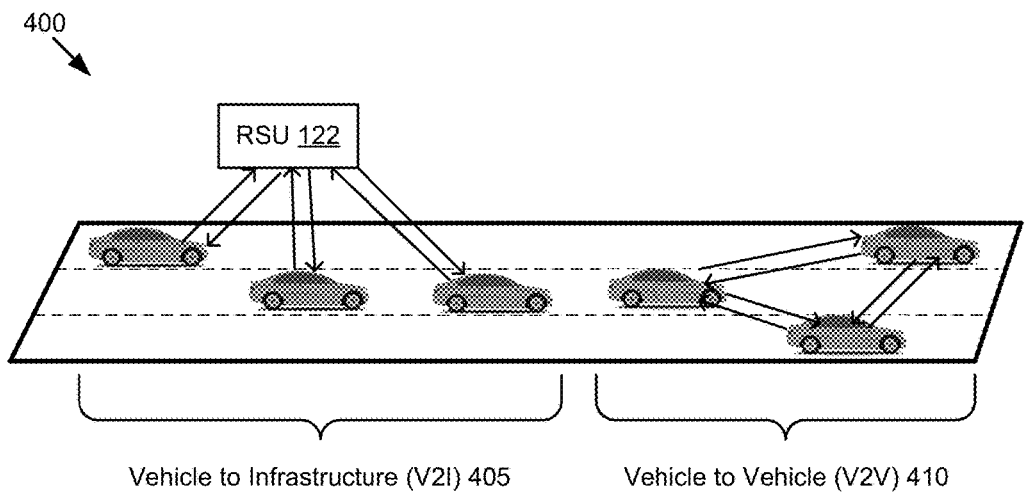
FIG. 4 is a block diagram illustrating example scenarios where mmWave communication occurs via vehicle to infrastructure mmWave communications or vehicle to vehicle mmWave communication according to some embodiments.

Turning to FIG. 4, a block diagram 400 illustrates example scenarios where mmWave communication occurs via vehicle to infrastructure 405 mmWave communications or vehicle to vehicle 410 mmWave communication. Large amounts of data may not be reasonably transmitted by conventional means, such as 3G, 4G, WiFi, or DSRC, because the data may be too large to transmit or the transmission would result in poor performance of the vehicle equipment. As a result, mmWave communications are an advantageous way to transmit the data. The vehicles may use vehicle to infrastructure 405 mmWave communications to share sensor data generated by each vehicle with the RSU 122 and/or HD-3D maps with the RSU 122. In some embodiments, the vehicles may perform vehicle to vehicle 410 mmWave communications. For example, the second vehicle 123 may transmit sensor data generated by the sensor set 150 to the first vehicle 121 using mmWave communications.

Transmission and reception of sensor data and HD-3D maps is advantageous for the second vehicle 123. For example, the sensor data may be used to expand sensor coverage for determining more accurate NLOS paths. In this way, the process may be iterative such that the path module 206 determines a NLOS path that is implemented by the beam alignment module 208 to transmit mmWave communications. The vehicle 123 may then receive mmWave communications with sensor data from other vehicles that the path module 206 uses to determine a more accurate NLOS path. As a result, each time the NLOS path is determined, the NLOS path may be more accurate because it is enhanced with the additional sensor data.

In another example, the sensor data may be transmitted to a cloud server and used to generate the HD-3D maps. As a result, the HD-3D maps are kept up-to-date with the continual sensor data. The vehicles 121, 123 may then receive portions of the HD-3D maps on demand. For example, the second vehicle 123 may transmit the second vehicle's 123 location to the RSU 122 and receive a mmWave communication from the RSU 122 that includes a portion of the HD-3D map that corresponds to the second vehicle's 123 location. The second vehicle 123 may transmit the second vehicle's 123 location periodically, each time the second vehicle 123 enters a new city, etc. The second vehicle 123 may receive the HD-3D map periodically, each time the second vehicle 123 enters a new city, etc. This advantageously reduces a need for the second vehicle 123 to store a large amount of data.

Figure 5:
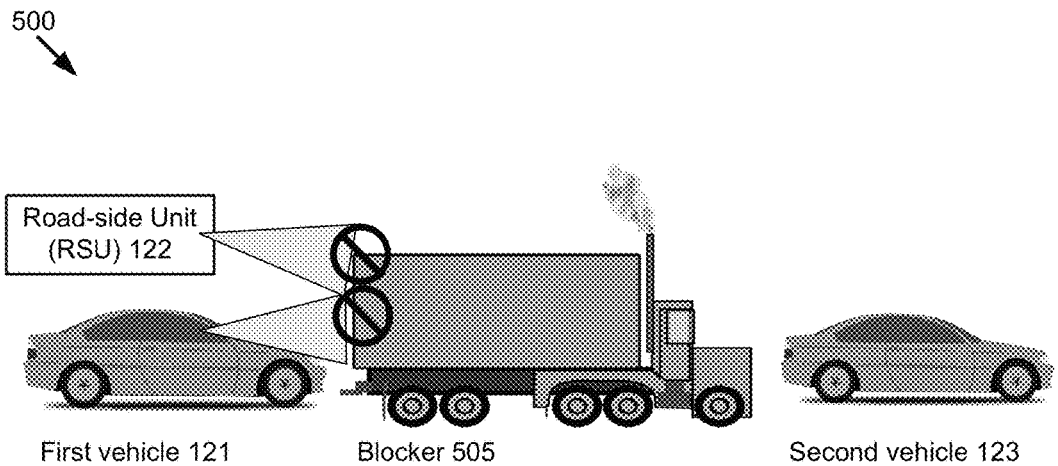
FIG. 5 is a block diagram illustrating the problem of using mmWave communication when a blocker is present according to some embodiments.

The use of mmWave communication is advantageous for transmitting large amounts of data. However, mmWave communication is most efficiently achieved when narrow beams are used instead of broad beams. This is because a broader usage of mmWave bands results in high propagation loss and reduced communication range with a broad beam in mmWave communications. In addition, blockage causes an additional propagation loss and makes it difficult to maintain a mmWave connection. As a result, the path module 206 determines whether a blockage is predicted to occur. If the blockage is not predicted to occur, the path module 206 may determine a path using fast beam alignment for mmWave communication. FIG. 5 illustrates why a blockage is problematic during mmWave communications.

FIG. 5 is a block diagram 500 illustrating the problem of using mmWave communication when a blocker is present according to some embodiments. In this example, the blocker 505 is a truck with a height that prevents mmWave communications between the first vehicle 121 and the second vehicle 123 or between the road-side unit 122 and the second vehicle 123. The blockage may occur due to a combination of (1) a low antenna height on either the first vehicle 121/RSU 122 and/or the second vehicle 123 and (2) a high mobility of the vehicle 121/RSU 122 and/or the second vehicle 123. Although some of the beams may reach the second vehicle 123, the blockage may cause a high propagation loss of a minimum of 7-20 dB, which makes it difficult to maintain a mmWave connection sufficient to implement mmWave communications.

In some embodiments, the path module 206 determines whether a blockage is predicted to occur based on wireless messages from the first vehicle 121 and from the blocker 505. For example, the blocker 505 may be equipped with a DSRC-compliant GPS unit 140B and may provide blocker vehicle data to the second vehicle 123, which the path module 206 combines with the first vehicle data 155 and the second vehicle data 157 to determine whether a blockage would occur at the time the beam is intended to be transmitted.

Figure 6:
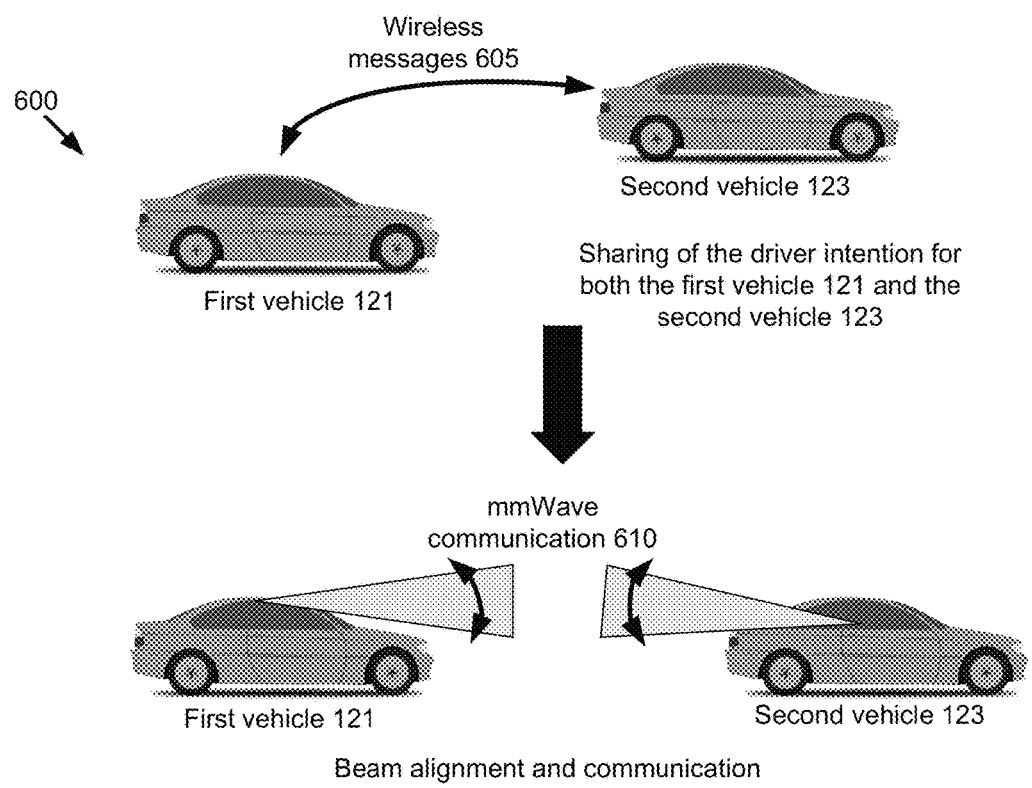
FIG. 6 is a block diagram illustrating the use of wireless messages to ensure beam alignment for mmWave communications according to some embodiments.

The problem of a blockage that interferes with mmWave communications may be resolved by transmitting wireless messages to determine driving intention and avoid the blockage. Turning to FIG. 6, a block diagram 600 illustrates the use of wireless messages to ensure beam alignment for mmWave communications. Although this example illustrates communications between a first vehicle 121 and a second vehicle 123, the communications may also occur between an RSU 122 and the second vehicle 123.

In this example, the first vehicle 121 and the second vehicle 123 each transmit a wireless message 605 that includes vehicle data. In some embodiments, the first vehicle 121 transmits first vehicle data 155 and the second vehicle 123 transmits second vehicle data 157. The vehicle data may include a vehicle position, a vehicle speed, a vehicle heading, and a driving intention. The driving intention includes a description of the location of the vehicle in the future.

The first vehicle 121 and the second vehicle 123 may use the vehicle data to determine parameters for beam alignment. For example, the driving intention may describe a likelihood that the first vehicle 121 will change directions to a particular location at a particular point in time. The second vehicle 123 may use the driving intention to determine exactly where to send a beam. The beam alignment module 208 may instruct the mmWave transceiver to transmit a mmWave communication 610 to the first vehicle 121 that includes data. The first vehicle 121 may perform a similar process based on the driving intention of the second vehicle 123.

If the path module 206 determines that a blockage is predicted to occur, the path module 206 determines a non-line of sight (NLOS) path based on the first vehicle data 155 and the second vehicle data 157. For example, the path module 206 may determine that a truck is between the first vehicle 121 and the second vehicle 123 and that the beam should be reflected off a building in order to reach the first vehicle 121. In some embodiments, the path module 206 uses sensor data and/or map data to identify objects that surround the second vehicle 123 and determine whether the objects can be used as reflectors that reflect a beam for mmWave communication. The path module 206 may use a ray-tracing simulation to determine the NLOS path.

Figure 7:
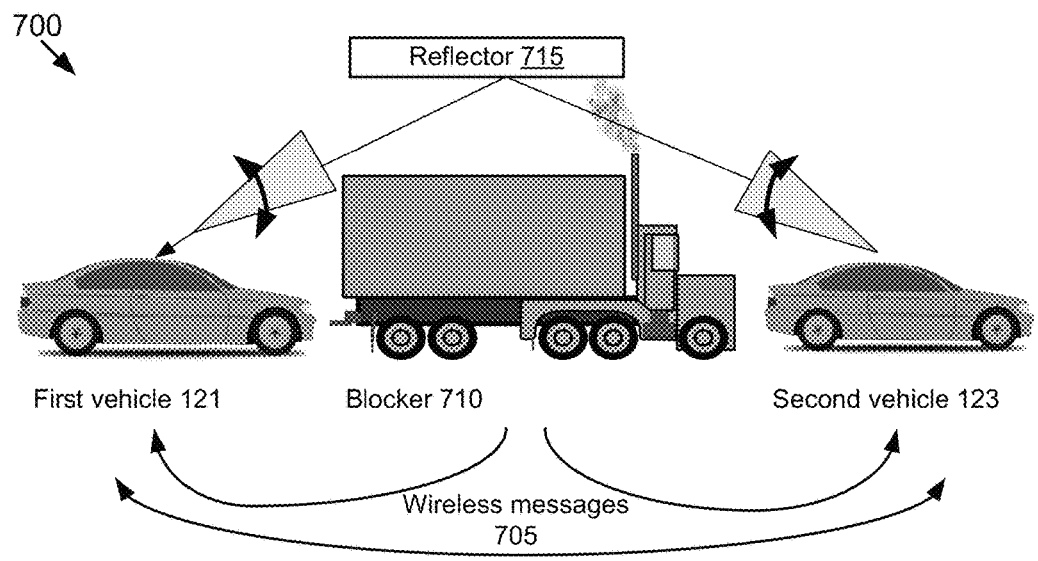
FIG. 7 is a block diagram illustrating how wireless messages are used to identify a blocker and avoid the blocker by using a reflector as part of a non-line of sight (NLOS) path according to some embodiments.

Turning to FIG. 7, a block diagram 700 illustrates how wireless messages 705 are used to identify a blocker 710 and avoid the blocker 710 by using a reflector 715 as part of a non-line of sight (NLOS) path. In this example, the second vehicle 123 receives wireless messages 705 from both the first vehicle 121 and the blocker 710. The wireless messages 705 may include map data and/or sensor data that describe the geographic landscape surrounding the vehicles. The path module 206 determines an NLOS path for avoiding the blocker 710 by using the reflector 715 to reflect the beam to the first vehicle 121 and, as a result, completely avoid the blocker 710.

Figure 8:
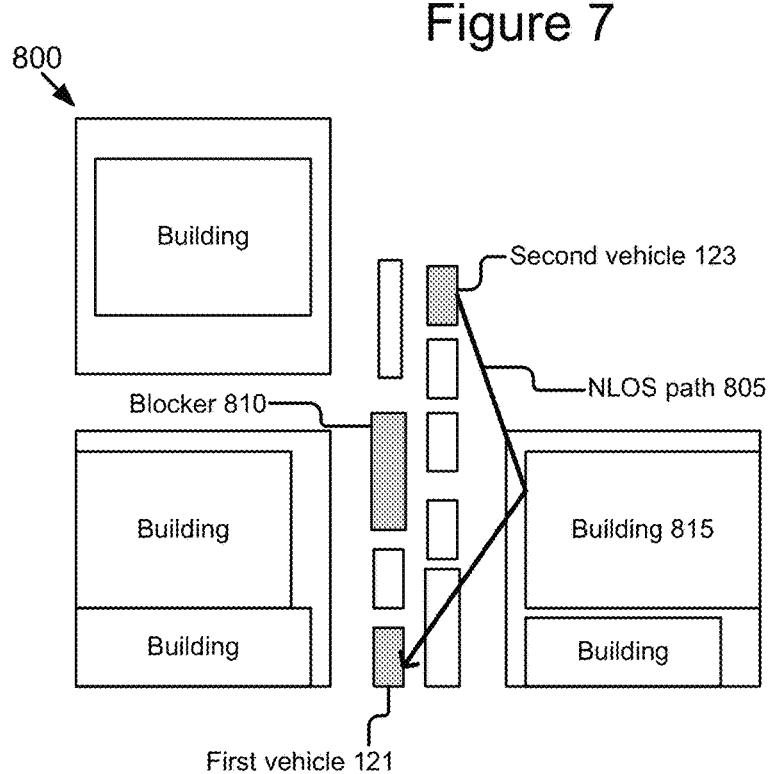
FIG. 8 is a block diagram illustrating a NLOS path for avoiding a blocker according to some embodiments.

FIG. 8 is a block diagram 800 illustrating a NLOS path 805 for avoiding a blocker 810 according to some embodiments. In this example, the path module 206 receives sensor data and/or map data that describe the surroundings between the vehicles. The path module 206 determines an NLOS path 805 that avoids the blocker 810 by using a building 815 as a reflector that reflects the beam off the building 815 to the first vehicle 121. As a result, the second vehicle 123 uses mmWave communication to communicate with the first vehicle 121. The mmWave communication may be used, for example, for the second vehicle 123 to communicate sensor data to the first vehicle 121. This may be particularly advantageous in an environment with many buildings, heavy traffic, and traffic conditions that arise in real-time.

If the path module 206 determines that a blockage is not predicted to occur, the path module 206 may determine parameters for fast beam alignment between the second vehicle 123 and the first vehicle 121.

The beam alignment module 208 can be software including routines for performing beam alignment. In some embodiments, the beam alignment module 208 can be a set of instructions executable by the processor 125 which, when executed by the processor 125, cause the processor 125 to execute one or more of the steps of the method 900 described below with reference to FIG. 9 and/or the method 1000 described below with reference to FIG. 10. In some embodiments, the beam alignment module 208 can be stored in the memory 127C of the computer system 200 and can be accessible and executable by the processor 125. The beam alignment module 208 may be adapted for cooperation and communication with the processor 125 and other components of the computer system 200 via signal line 228.

The beam alignment module 208 instructs the mmWave communication radio 207 to perform beam alignment and establish a communication link with the first vehicle 121. If the path module 206 determines that a blockage is predicted, the beam alignment module 208 uses the NLOS path data 159 to align the beams. If the path module 206 determines that a blockage is not predicted, the beam alignment module 208 may determine the parameters for fast beam alignment between the second vehicle 123 and the first vehicle 121 based on the second vehicle position the second vehicle driving intention, and the first vehicle data. For example, the beam alignment module 208 may instruct the mmWave communication radio 207 to perform beam sweeping, a restricted beam search, or other technique to establish the communication link based on the driving intention of the vehicles.

Once the communication link is established, the beam alignment module 208 instructs the mmWave communication radio 207 to transmit mmWave communications to the first vehicle 121.

The user interface module 210 can be software including routines for generating graphical data for displaying a user interface. In some embodiments, the user interface module 210 can be stored in the memory 127C of the computer system 200 and can be accessible and executable by the processor 125. The user interface module 210 may be adapted for cooperation and communication with the processor 125 and other components of the computer system 200 via signal line 230.

In some embodiments, the user interface module 210 generates graphical data for displaying a user interface for a user, such as a driver of the second vehicle 123. The user interface module 210 may generate graphical data for displaying a user interface that provides the user with options for configuring aspects of the beam alignment application 199. For example, the user interface may include an option for associating the beam alignment application 199 with other applications, such as a map application, so that the beam alignment application 199 has access to journey data that describes a journey the driver is taking with the second vehicle 123. In some embodiments the beam alignment application 199 includes other features, such as a map module that provides driving directions to the driver. In these embodiments, the user interface module 210 may generate graphical data for the other features, such as graphical data for displaying a user interface for inputting a destination with a request button for generating driving directions.

Example Methods

Figure 9:
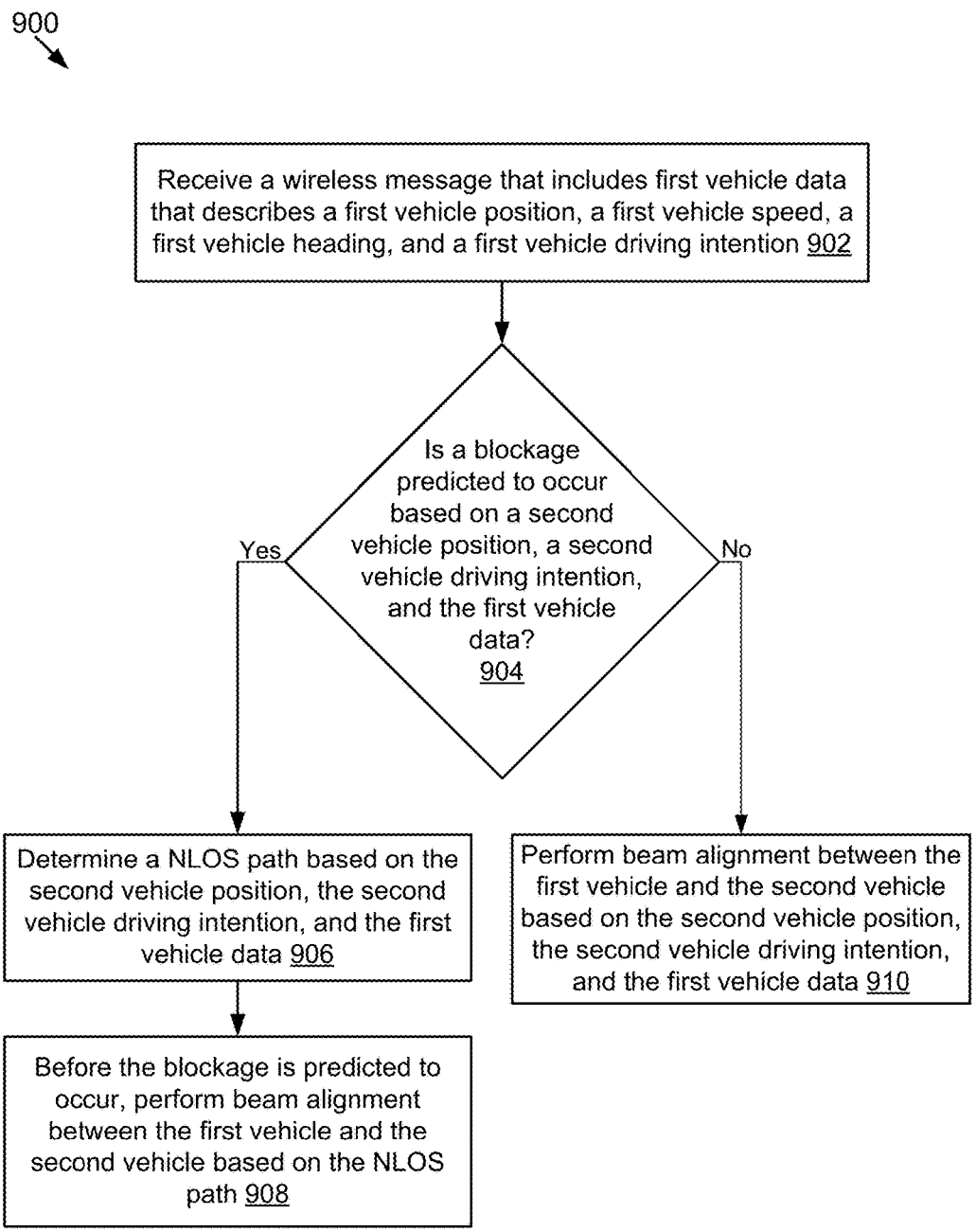
FIG. 9 is a flowchart of an example method for performing beam alignment based on shared driving intention according to some embodiments.

Referring now to FIG. 9, depicted is a method 900 for performing beam alignment based on shared driving intention. One or more of the steps described herein for the method 900 may be executed by the beam alignment application 199 of FIG. 1 and/or the computer system 200 of FIG. 2.

At step 902, a wireless message is received that includes first vehicle data 155 that describes a first vehicle position, a first vehicle speed, a first vehicle heading, and a first vehicle driving intention. The wireless message may be a DSRC message, such as a BSM message, or a LTE-V2X message. The wireless message may be received from a first vehicle 121 or an RSU 122.

At step 904, it is determined whether a blockage is predicted to occur based on a second vehicle position, a second vehicle driving intention, and the first vehicle data 155. The blockage may occur if there is a third vehicle located between the first vehicle 121 and the second vehicle 123 and the third vehicle is taller than the first vehicle 121 or the second vehicle 123.

If the blockage is predicted to occur, at step 906, a NLOS path is determined based on the second vehicle position, the second vehicle driving intention, and the first vehicle data 155. At step 908, before the blockage is predicted to occur, beam alignment is performed between the first vehicle 121 and the second vehicle 123 based on the NLOS path.

If the blockage is not predicted to occur, at step 910 beam alignment is performed between the first vehicle 121 and the second vehicle 123 based on the second vehicle position, the second vehicle driving intention, and the first vehicle data 155.

Figure 10:
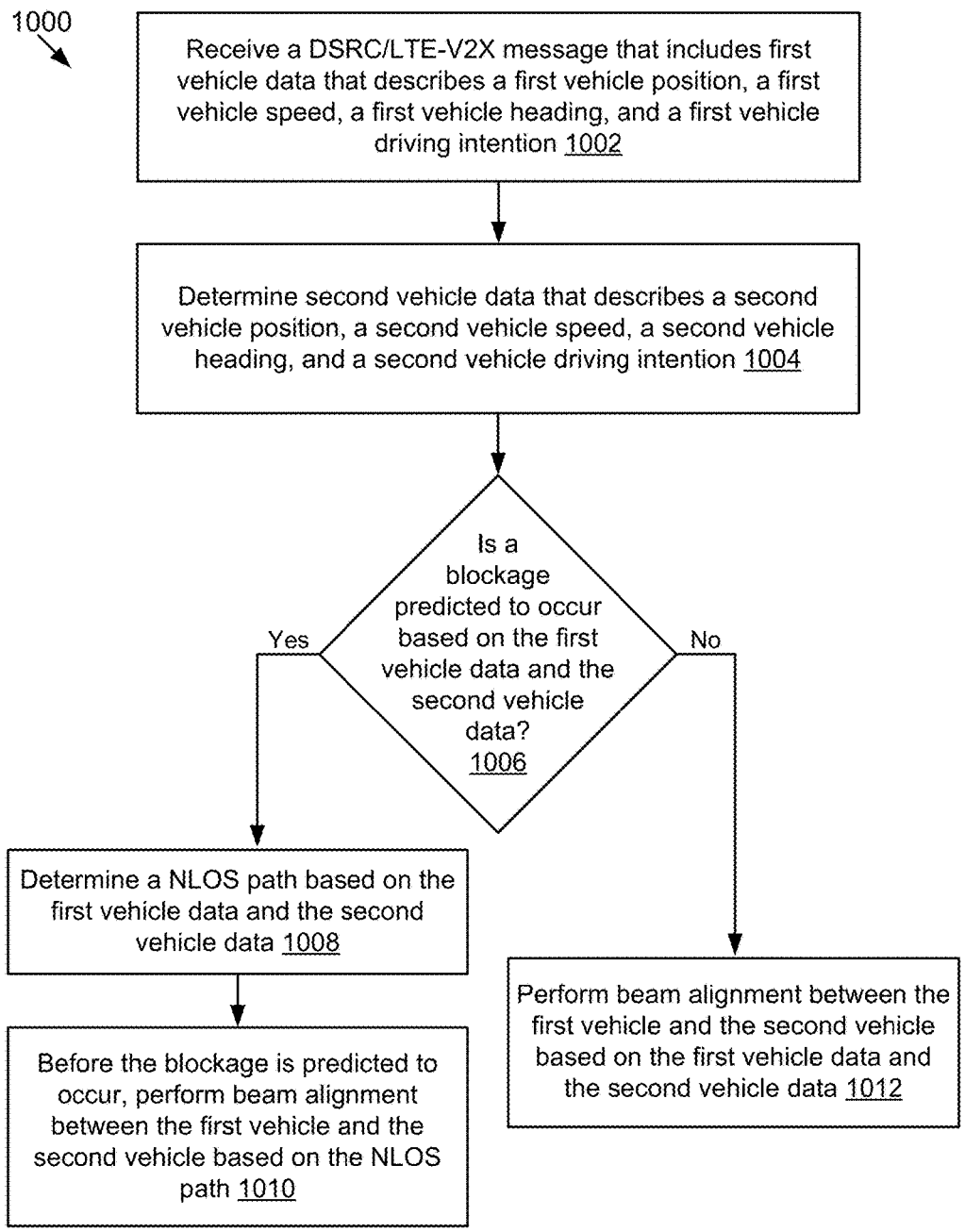
FIG. 10 is a flowchart of another example method for performing beam alignment based on shared driving intention according to some embodiments.

Referring now to FIG. 10, depicted is another example method 1000 for performing beam alignment based on shared driving intention. One or more of the steps described herein for the method 1000 may be executed by the beam alignment application 199 of FIG. 1 and/or the computer system 200 of FIG. 2.

At step 1002, a DSRC/LTE-V2X message that includes first vehicle data 155 that describes a first vehicle position, a first vehicle speed, a first vehicle heading, and a first vehicle driving intention. At step 1004, second vehicle data 157 is determined that describes a second vehicle position, a second vehicle speed, a second vehicle heading, and a second vehicle driving intention.

At step 1006, it is determined whether a blockage is predicted to occur based on the first vehicle data 155 and the second vehicle data. If the blockage is predicted to occur, at step 1008, a NLOS path is determined based on the first vehicle data 155 and the second vehicle data 157. At step 1010, before the blockage is predicted to occur, beam alignment is performed between the first vehicle 121 and the second vehicle 123 based on the NLOS path. If the blockage is not predicted to occur, at step 1012, beam alignment is performed between the first vehicle and the second vehicle based on the first vehicle data 155 and the second vehicle data 157.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving a wireless message that includes first vehicle data that describes a first vehicle position, a first vehicle speed, a first vehicle heading, and a first vehicle driving intention;
   determining whether a blockage is predicted to occur based on a second vehicle position, a second vehicle driving intention, and the first vehicle data;
   responsive to the blockage being predicted to occur, determining a non-line of sight (NLOS) path based on the second vehicle position, the second vehicle driving intention, and the first vehicle data; and
   before the blockage is predicted to occur, performing beam alignment between the first vehicle and the second vehicle based on the NLOS path.

2. The method of claim 1, further comprising:
   responsive to the blockage not being predicted to occur, performing beam alignment based on the second vehicle position, the second vehicle driving intention, and the first vehicle data.

3. The method of claim 1, wherein the first vehicle driving intention describes coarse driving intention and a planned trajectory.

4. The method of claim 1, further comprising:
   transmitting a millimeter wave (mmWave) communication based on the beam alignment.

5. The method of claim 1, wherein the wireless message is a dedicated short range communication message (DSRC) or a long-term evolution vehicle to everything (LTE-V2X) message.

6. The method of claim 1, wherein the NLOS path includes reflecting a beam off of a reflector to reach the first vehicle.

7. The method of claim 1, further comprising:
   determining second vehicle data that describes the second vehicle position, a second vehicle speed, a second vehicle heading, and the second vehicle driving intention; and
   wherein determining the NLOS path is further based on the second vehicle speed and the second vehicle heading.

8. The method of claim 7, wherein the wireless message is transmitted by the first vehicle or a road-side unit (RSU).

9. The method of claim 1, wherein the blockage is a third vehicle, the second vehicle receives a DSRC message or a LTE-V2X message that includes third vehicle data, and determining whether the blockage is predicted to occur is further based on the third vehicle data.

10. A system comprising:
    an onboard vehicle computer system of a vehicle that is Dedicated Short Range Communication-enabled ("DSRC-enabled") and that includes a non-transitory memory storing computer code which, when executed by the onboard vehicle computer system causes the onboard vehicle computer system to:
    receive a wireless message that includes first vehicle data that describes a first vehicle position, a first vehicle speed, a first vehicle heading, and a first vehicle driving intention;
    determine whether a blockage is predicted to occur based on a second vehicle position, a second vehicle driving intention, and the first vehicle data;
    responsive to the blockage being predicted to occur, determine a non-line of sight (NLOS) path based on the second vehicle position, the second vehicle driving intention, and the first vehicle data; and
    before the blockage is predicted to occur, perform beam alignment between the first vehicle and the second vehicle based on the NLOS path.

11. The system of claim 10, wherein the onboard vehicle computer system includes additional computer code that causes the onboard vehicle computer system to:

responsive to the blockage not being predicted to occur, performing beam alignment based on the second vehicle position, the second vehicle driving intention, and the first vehicle data.

12. The system of claim 10, wherein the first vehicle driving intention describes coarse driving intention and a planned trajectory.

13. The system of claim 10, wherein the onboard vehicle computer system includes additional computer code that causes the onboard vehicle computer system to:
transmit a millimeter wave (mmWave) communication based on the beam alignment.

14. The system of claim 10, wherein the wireless message is a dedicated short range communication message (DSRC) or a long-term evolution vehicle to everything (LTE-V2X) message.

15. A non-transitory memory encoded with a computer program, the computer program comprising instructions that, when executed by one or more processors, cause the one or more processors to perform operations comprising:
receiving a wireless message from a vehicle that includes vehicle data that describes a vehicle position, a vehicle speed, a vehicle heading, and a vehicle driving intention;
determining whether a blockage is predicted to occur based on a roadside unit (RSU) position and the vehicle data;
responsive to the blockage being predicted to occur, determining a non-line of sight (NLOS) path based on the RSU position and the vehicle data; and
before the blockage is predicted to occur, performing beam alignment between the RSU and the vehicle based on the NLOS path.

16. The non-transitory memory of claim 15, wherein the operations further comprise:
responsive to the blockage not being predicted to occur, performing beam alignment based on the RSU position and the vehicle data.

17. The non-transitory memory of claim 15, wherein the vehicle driving intention describes coarse driving intention and a planned trajectory.

18. The non-transitory memory of claim 15, wherein the operations further comprise:
transmitting a millimeter wave (mmWave) communication to the vehicle based on the beam alignment, wherein the mmWave communication includes high-definition three-dimensional map data or sensor data.

19. The non-transitory memory of claim 15, wherein the wireless message is a dedicated short range communication message (DSRC) or a long-term evolution vehicle to everything (LTE-V2X) message.

20. The non-transitory memory of claim 15, wherein the NLOS path includes reflecting a beam off of a reflector to reach the vehicle.

* * * * *